United States Patent
Carroll, III et al.

[11] Patent Number: 6,017,084
[45] Date of Patent: Jan. 25, 2000

[54] ENERGY ABSORBING ASSEMBLY

[75] Inventors: Phillip Patrick Carroll, III, Bloomfield Hills; Joel Matthew Cormier, Ferndale; Donald Scott Smith, Commerce Township; Richard Francois Audi, Dearborn, all of Mich.

[73] Assignee: Oakwood Energy Management Inc., Dearborn, Mich.

[21] Appl. No.: 09/018,666

[22] Filed: Feb. 4, 1998

[51] Int. Cl.[7] .................................................. B60R 21/04
[52] U.S. Cl. ........................... 296/189; 293/132; 280/751
[58] Field of Search .................................. 296/189, 39.1; 293/102, 132, 133, 109, 110; 280/751, 748; 206/521.4, 521.9

[56] References Cited

U.S. PATENT DOCUMENTS

| | | |
|---|---|---|
| 2,349,907 | 5/1944 | Kos et al. . |
| 3,871,636 | 3/1975 | Boyle . |
| 3,997,207 | 12/1976 | Norlin . |
| 4,029,350 | 6/1977 | Goupy et al. . |
| 4,190,276 | 2/1980 | Hirano et al. . |
| 4,321,989 | 3/1982 | Meinzer . |
| 4,352,484 | 10/1982 | Gertz et al. . |
| 4,413,856 | 11/1983 | McMahan et al. .................. 296/189 X |
| 4,635,981 | 1/1987 | Friton . |
| 4,666,130 | 5/1987 | Denman et al. . |
| 4,720,261 | 1/1988 | Fishwick et al. . |
| 4,844,213 | 7/1989 | Travis . |
| 4,909,661 | 3/1990 | Ivey . |
| 5,033,593 | 7/1991 | Kazuhito .............................. 296/189 X |
| 5,141,279 | 8/1992 | Weller ................................... 296/189 X |
| 5,165,990 | 11/1992 | Nakano . |
| 5,192,157 | 3/1993 | Laturner . |
| 5,306,066 | 4/1994 | Saathoff .............................. 296/189 X |
| 5,364,682 | 11/1994 | Tanaka et al. . |
| 5,435,619 | 7/1995 | Nakae et al. ............................ 296/189 |
| 5,500,037 | 3/1996 | Alhamad . |
| 5,573,272 | 11/1996 | Teshima .................................. 280/751 |
| 5,636,866 | 6/1997 | Suzuki et al. ....................... 296/189 X |
| 5,660,426 | 8/1997 | Sugimori et al. ....................... 296/189 |
| 5,700,545 | 12/1997 | Audi et al. . |
| 5,727,826 | 3/1998 | Frank et al. ............................ 293/102 |
| 5,762,392 | 6/1998 | Suga .................................. 296/189 X |

*Primary Examiner*—Joseph D. Pape
*Attorney, Agent, or Firm*—Brooks & Kushman P.C.

[57] ABSTRACT

An energy absorbing assembly 10 is provided for decelerating an object that impacts the assembly. The assembly comprises an incident member 12 having an incident surface 14 that meets the impacting object and at least one energy absorbing member 16 attached to an attachment region 17 of an opposing face 18 of the incident member 12 for accommodating deformation of the assembly 10. The energy absorbing member 16 comprises a lattice of interconnected strands 20, wherein the strands 20 intersect to define a plurality of cells 22. The energy absorbing member 16 is oriented such that the plane of each cell 22 is substantially perpendicular to the attachment region 17 in order to maximize energy absorption over a given distance. The lattice collapses and at least some of the cells 22 become at least partially closed during energy absorption.

28 Claims, 5 Drawing Sheets

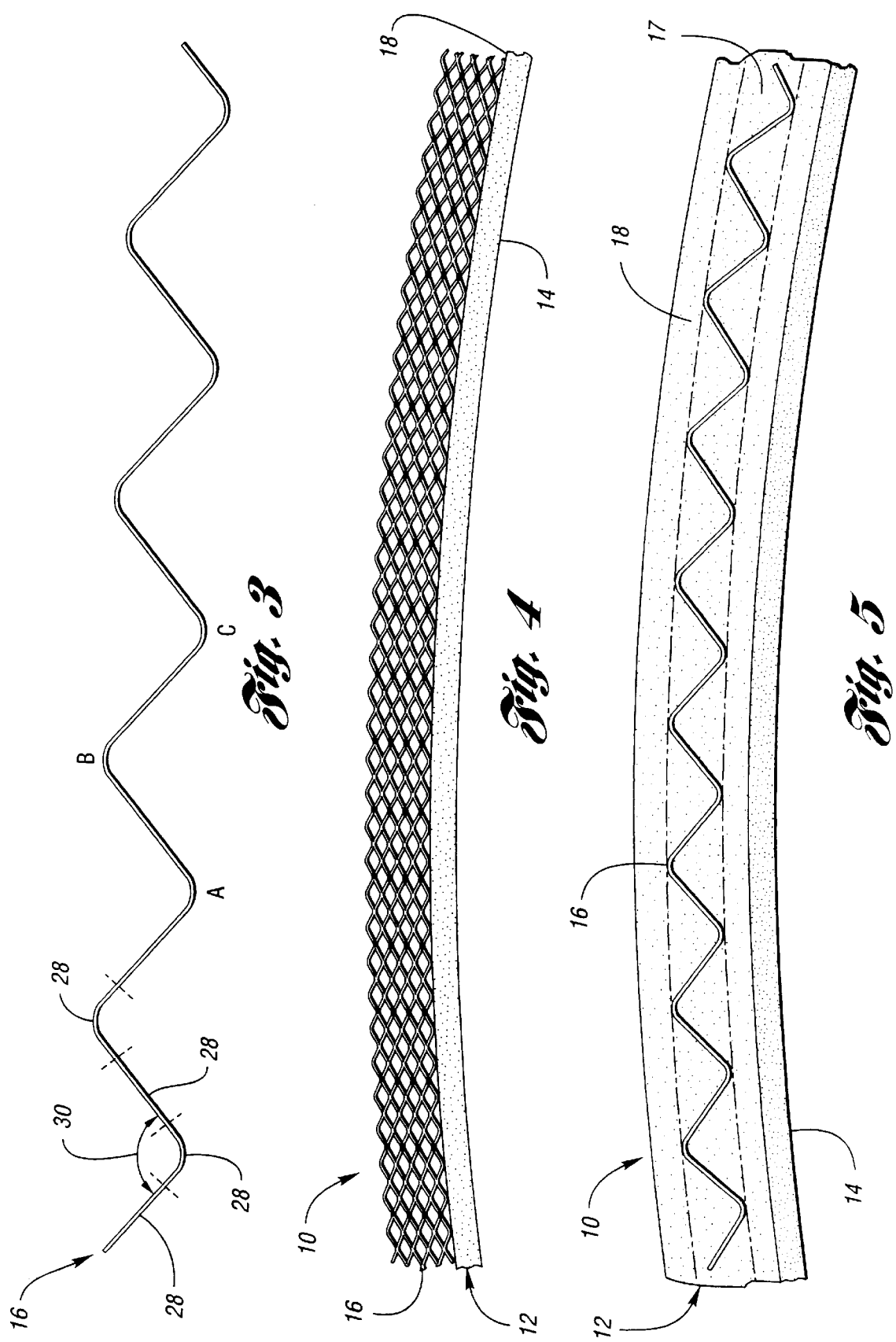

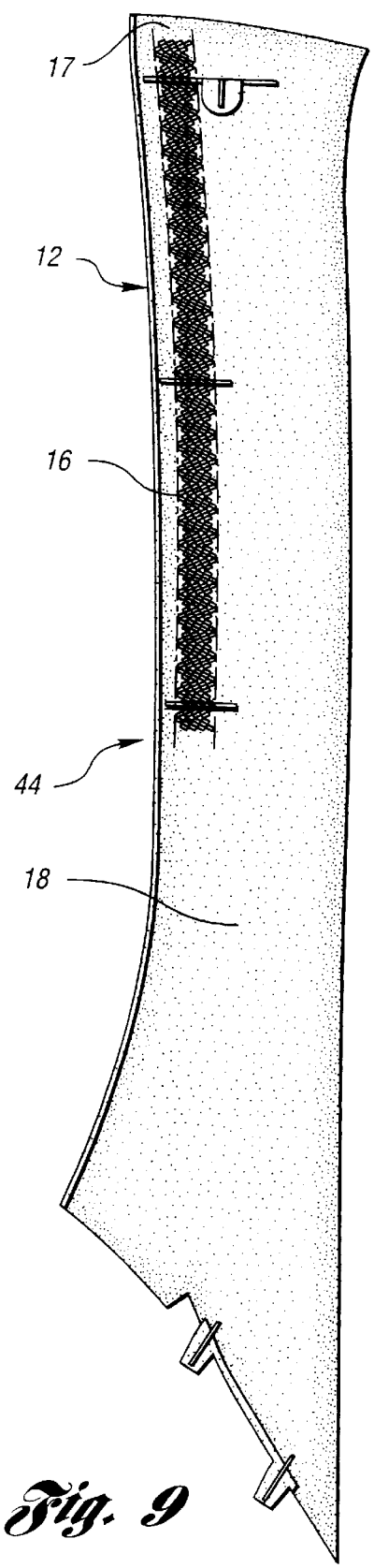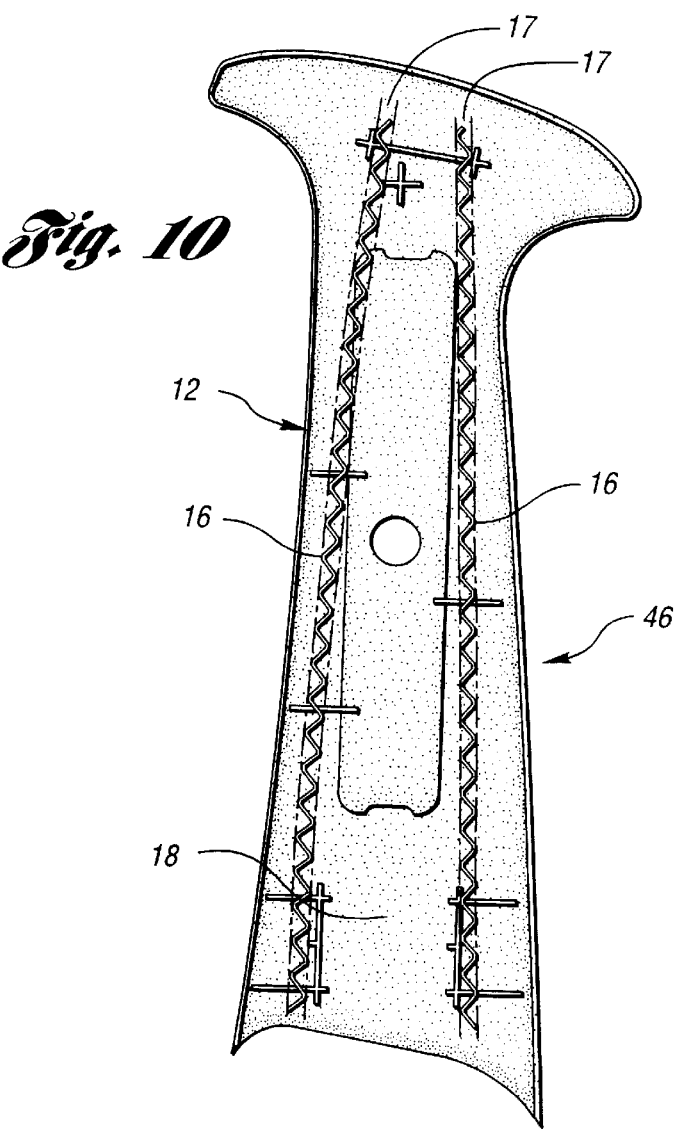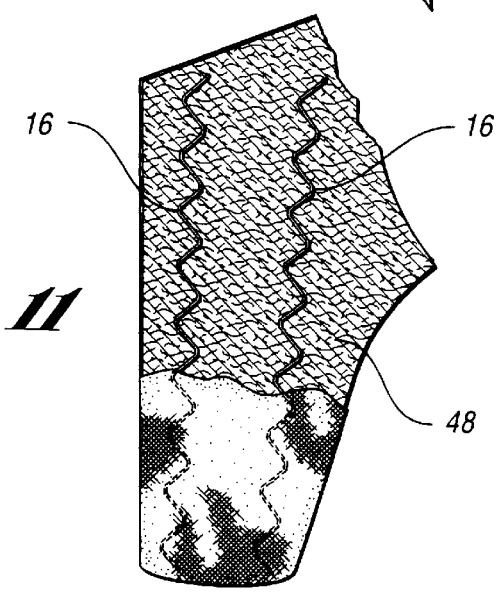

ENERGY ABSORBING ASSEMBLY

TECHNICAL FIELD

This invention relates to an energy absorbing assembly for decelerating an object that impacts the assembly into which an energy absorbing member is placed.

BACKGROUND ART

In many fields it is desirable to provide assemblies which are able to decelerate, in a given, limited distance, an object which impacts the assembly. To do so, the assembly must absorb a significant percentage of the impact energy transferred by the object. In the past, this has been accomplished physically by providing the assembly with an energy absorbing member for supporting deformation of the assembly in order to absorb the energy of the impacting object.

Within a vehicle, for example, occupants require protection from impact with interior components such as the pillars and headrails. These structures are typically made of steel tubing or steel channels which are welded together to form the structural cage or unitized body for the vehicle. Designers have attempted to place energy absorbers over the pillars, headrails other parts of a vehicle to protect the vehicle occupants. Prior art approaches are found in the use of energy absorbing urethanes, rigid polymeric foams, blocks or cells or vanes of engineered plastics, various sheet metal configurations, metal beams, honeycombed metal, and other geometric solids. Most of these materials, however, while crushing generally absorb less than the desired amount of energy for a given displacement.

The desired response of an energy absorbing material from initial loading to failure is one wherein a near "square wave" response of force versus deflection is produced, such that the force exerted on the decelerated object is nearly unchanged over a desired range of crush distance or deflection. Commonly owned U.S. Pat. No. 5,700,545 issued to Audi et al. discloses such an energy absorbing structure, the disclosure of which is herein incorporated by reference. The energy absorbing member disclosed therein comprises an array of material, such as expanded metal, configured with vertical supporting faces which are generally orthogonal to spacing faces lying in the plane of an incident surface. While the energy absorption characteristics of such a structure are improved compared with those of the prior art, due to its configuration only the supporting faces, representing ~50% of the absorbing member, are utilized in energy absorption. The spacing faces play or no part in energy absorption since they generally lie in a plane orthogonal to the direction of impact.

Therefore, a need exists for an energy absorbing assembly which maximizes the use of energy absorbing members, so that maximum collapsible material is harnessed to produce superior energy absorbing characteristics and optimize the amount of energy absorbed per unit mass and per unit deflection of the energy absorbing member compared with prior art structures.

SUMMARY OF THE INVENTION

It is an object of the present invention to provide an energy absorbing assembly which decelerates an impacting object in a given, limited distance after engagement with the assembly.

It is a further object of the present invention to provide an energy absorbing assembly that maximizes the energy absorption over a given distance as compared with prior art structures.

It is a still further object of the present invention to provide an energy absorbing assembly which absorbs energy in a near square-wave manner.

It is another object of the present invention to provide an energy absorbing assembly which is adapted for mounting on a vehicle in order to provide impact protection.

Accordingly, an energy absorbing assembly is provided for decelerating an object that impacts the assembly. The assembly comprises an incident member having an incident surface that meets the impacting object and at least one energy absorbing member attached to an attachment region of an opposing face of the incident member for accommodating deformation of the assembly. The energy absorbing member comprises a lattice of interconnected strands, wherein the strands interconnect to define a plurality of cells. The energy absorbing member is oriented such that the plane of each cell is substantially perpendicular to the attachment region in order to maximize energy absorption over a given distance. The lattice collapses and at least some of the cells become at least partially closed during energy absorption.

The above objects and other objects, features, and advantages of the present invention are more readily understood from a review of the attached drawings and the accompanying specification and claims.

BRIEF DESCRIPTION OF THE DRAWINGS

FIG. 3 is a top plan view of a serpentine embodiment of the energy absorbing member of the present invention;

FIG. 4 is a side view of a planar embodiment of the energy absorbing member as it is deformed in a plane perpendicular to the incident surface;

FIG. 5 is a top view of a serpentine embodiment of the energy absorbing member as it is deformed in a plane parallel to the incident surface;

FIG. 9 shows an energy absorbing member attached to a typical vehicle A pillar cover;

FIG. 10 shows an energy absorbing member attached to a typical vehicle B pillar cover; and FIG. 11 shows an energy absorbing member encased within a filler material.

BEST MODES FOR CARRYING OUT THE INVENTION

Figure 1:
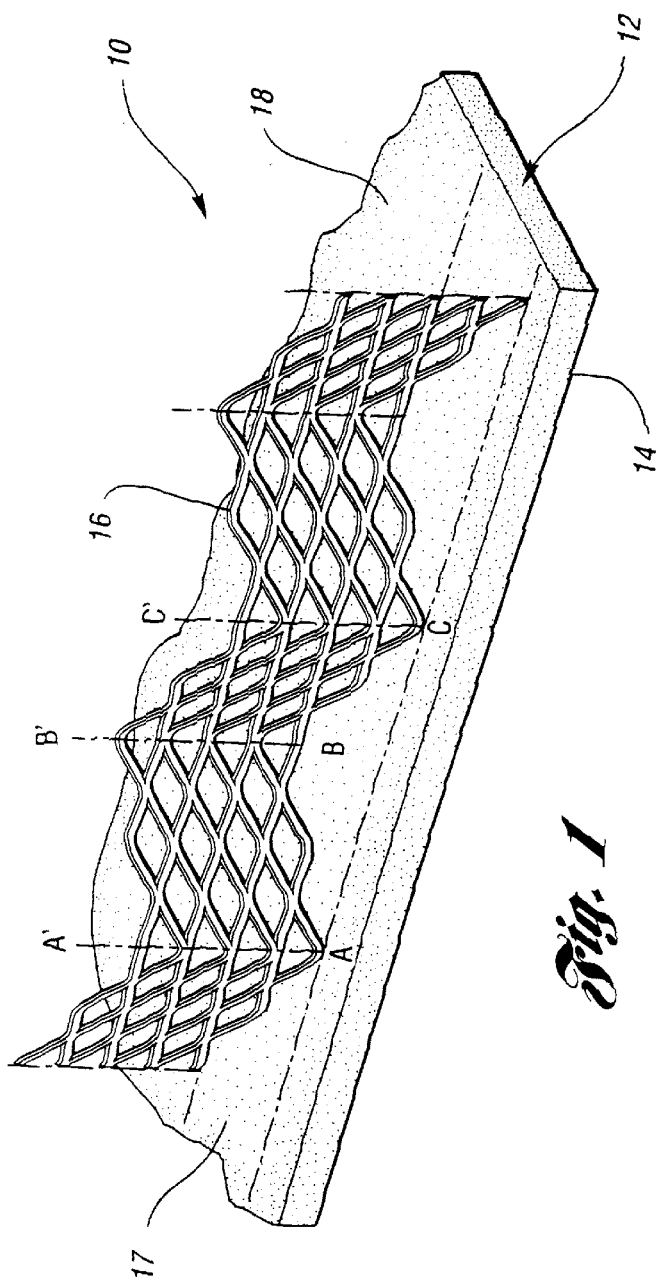
FIG. 1 depicts a perspective view of the energy absorbing assembly of the present invention.

Referring first to FIG. 1, there is depicted an energy absorbing assembly 10 for decelerating an object (not shown) that impacts the assembly. In the preferred embodiment, assembly 10 comprises an incident member 12 having an incident surface 14 that meets the impacting object. At least one energy absorbing member 16 is attached to an attachment region 17 of an opposing face 18 of incident member 12 for accommodating deformation of assembly 10.

Figure 2:
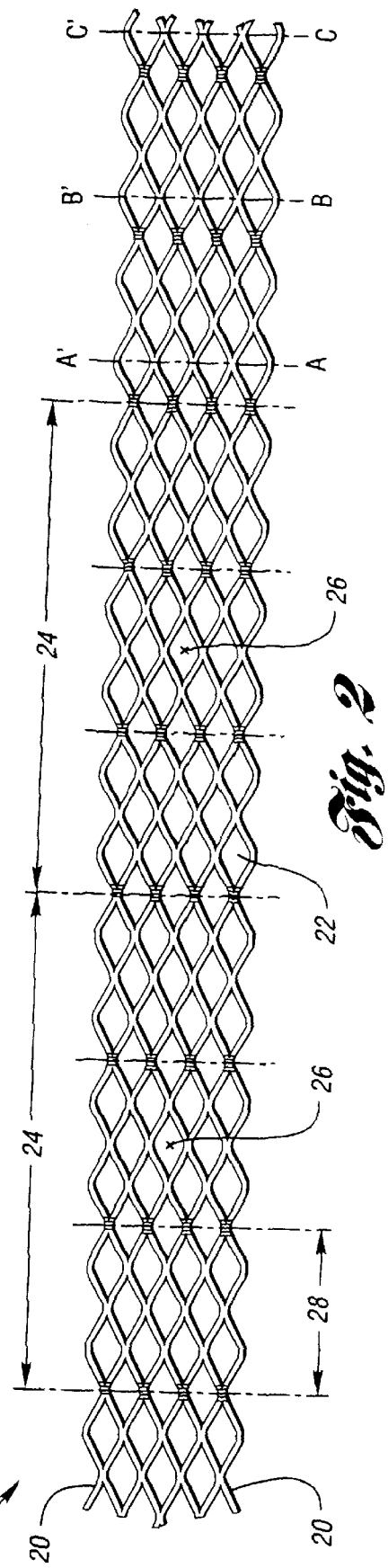
FIG. 2 is a side elevational view of a planar embodiment of the energy absorbing member of the present invention.

Referring now to FIG. 2, each energy absorbing member 16 comprises a lattice of interconnected strands 20 of a material, such as expanded metal, which provides assembly 10 with the characteristic energy absorption. The expanded metal from which energy absorbing member 16 is preferably formed is available from sources such as the McNichols Company of Tampa, Fla. The material is available in numerous styles and can be constructed of various materials, depending upon the desired energy absorption characteristics of assembly 10. Representative materials include carbon steel, ASTM-F-1267-9-1, HD galvanized steel, aluminum (5005 H 34), stainless steel type 304, stainless steel type 316, and the like. If desired, a protective coating can be applied to the expanded metal to provide corrosion resistance.

Alternatively, the lattice could be composed of any form of steel, plastic, or composite material. It will be apparent to those skilled in the art that the lattice could be formed by perforating, expanding, burning, punching, laser cutting, or blanking a sheet. The lattice could be formed by molding, casting, or other solidification processes, or by welding, brazing, or other joining processes. Following lattice formation, energy absorbing member 16 is preferably flattened by stamping, roll-forming, or other similar processes.

Accordingly the term "lattice" is meant to encompass these and their equivalent structures.

Strands 20 within energy absorbing member 16 intersect to define a plurality of cells 22 (FIG. 2). Cells 22 are preferably diamond-shaped before impact of the object, but cells 22 may be pie-shaped or polygonal having any number of sides, with the sides being curved or straight. The lattice structure is preferably configured to be 1–5 cells in height. In the preferred embodiment, energy absorbing member 16 is oriented such that the plane of each cell 22 is substantially perpendicular to attachment region 17 (best shown in FIG. 1), as illustrated by lines A–A', B–B', and C–C'. Using such a configuration, each cell may be effective in absorbing impact energy. The terminology "substantially perpendicular" is used to indicate the possible necessity of canting the energy absorption member 16, up to about 45 degrees, to compensate for curvature of incident member 12.

Still referring to FIG. 2, the lattice structure of energy absorbing member 16 comprises a plurality of interconnected sectors 24, wherein each sector 24 has a center point 26. Sectors 24 may be coplanar, as depicted in FIG. 2, or may lie in different planes to form sawtooth, squared, serpentine, or any other type of configuration of energy absorbing member 16. Each sector 24 further includes a plurality of interconnected segments 28, which may be planar or curvilinear in form, as shown in FIG. 3. Planar and curvilinear segments are joined to form a preferred, generally serpentine configuration of energy absorption member 16. Points A, B, and C denoted in FIG. 3 correspond with points A, B, and C shown in FIG. 1. For a given curvilinear segment 28, the angle 30 within the segment may vary between almost 0 and 180 degrees. Preferably, the radius defined by angle 30 is 2 to 4 times the thickness of the energy absorbing material.

As depicted in FIG. 4, any embodiment of energy absorbing member 16 may be deformed within a plane which is substantially perpendicular to incident surface 14, in order to conform to the curvature of incident member 12, which in some cases, may not be perfectly flat. Similarly, any configuration of energy absorbing member 16 may also be deformed within a plane which is substantially parallel to incident surface 14, as illustrated by the top view of FIG. 5.

Figure 6:
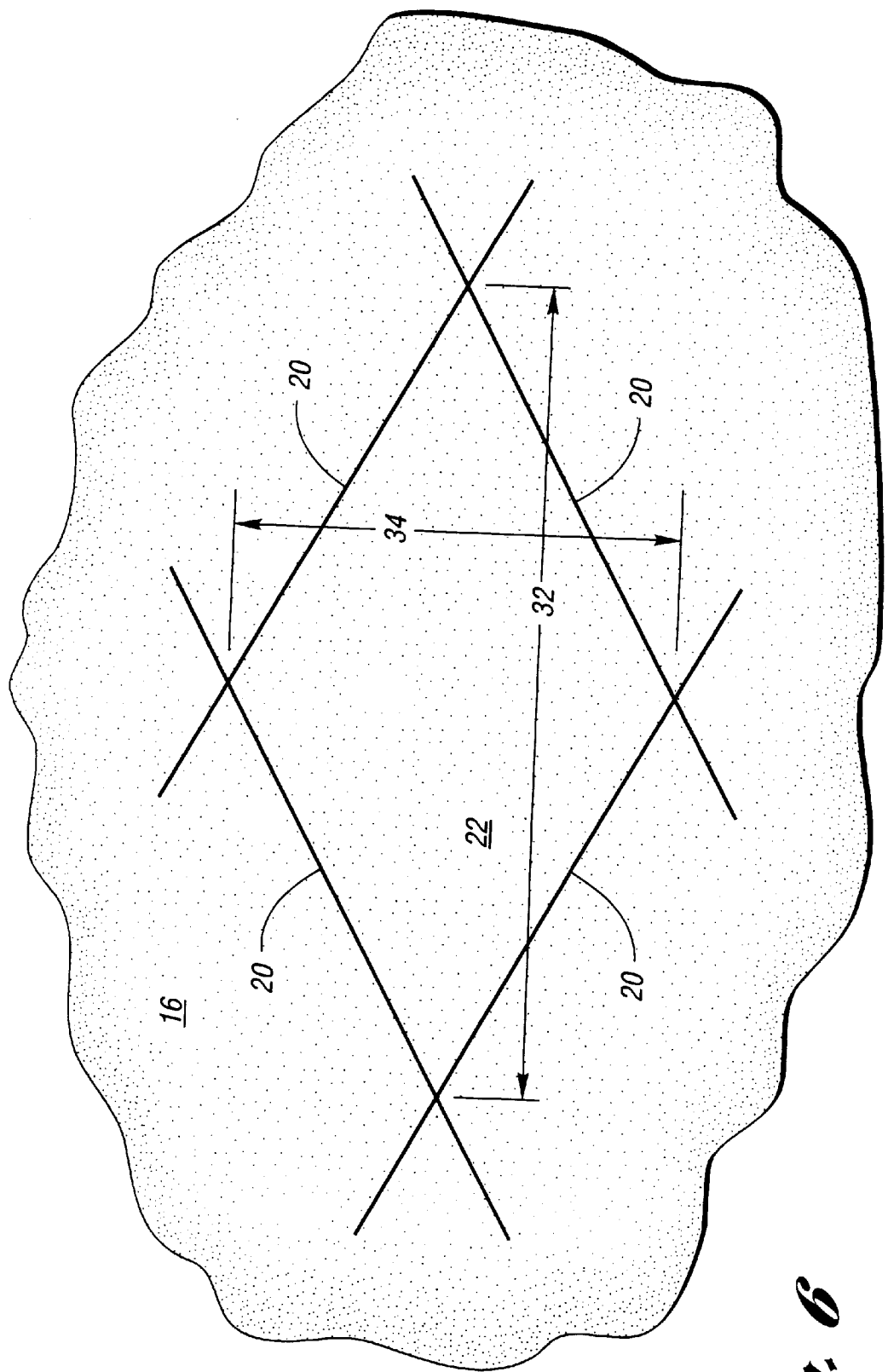
FIG. 6 is an enlarged, fragmentary view of a single cell within the energy absorbing member of the present invention.

Referring now to FIG. 6, a representative cell 22 within energy absorbing member 16 is shown. Each cell 22 is defined by a major axis 32 and a minor axis 34, wherein major axis 32 is longer than minor axis 34. In the preferred embodiment, each cell 22 is oriented such that its minor axis 34 is substantially perpendicular to incident surface 14 and its major axis 32 is substantially parallel to incident surface 14, for reasons to be explained below.

The cells 22 within the lattice cooperate to provide a concatenated, progressive reaction to the impact forces generated by a collision of an object with energy absorbing assembly 10. As compression proceeds, the cells 22 become flattened in an analogous manner to that of the bellows of an accordion upon being squeezed. Ultimately, however, the lattice is no longer able to absorb the impact force. At that point, cells 22 become collapsed, and energy absorbing member 16 yields moreso as a collapsing column. Nevertheless, during energy absorption the reaction to the impact forces has remained substantially constant during compression of the lattice, as will be shown below.

The actual deformation mechanics on a micro-structural or finite element level are more detailed and/or complex. It should be recognized that the disclosed invention encompasses all possible strand conformations and deformation mechanics.

The quality of the energy absorbing characteristics of an absorber may be defined by a shape factor which is calculated by integrating an actual force-deflection curve for the absorber over a given crush distance to determine the actual energy absorbed, and then dividing this quantity by the maximum force over the defined distance multiplied by the defined distance. This calculation has the effect of dividing the actual area under the curve by a perfect square-wave. Consequently, a shape factor approaching 1.0 indicates an absorber with better energy absorbing characteristics than a shape factor approaching 0.

Figure 7:
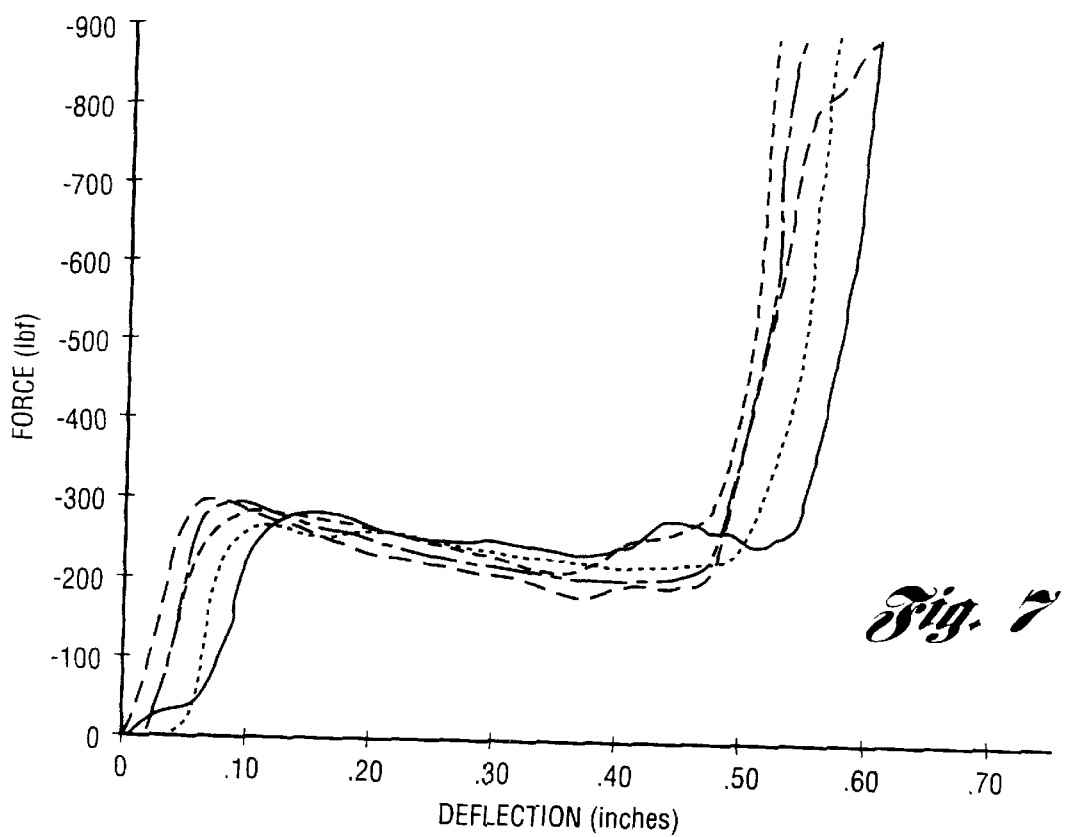
FIG. 7 is a force-deflection graph for the energy absorbing member of the present invention in which the cells are aligned such that the minor axis is generally parallel to the direction of impact.
Figure 8:
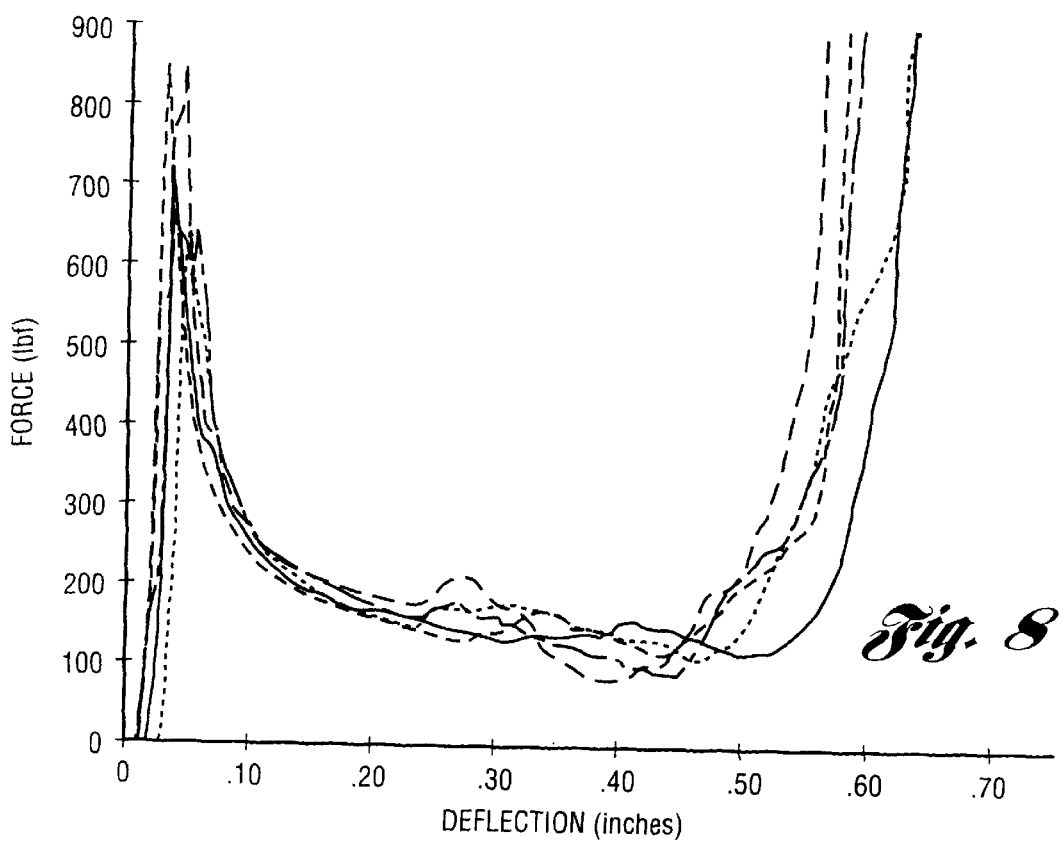
FIG. 8 is a force-deflection graph for the energy absorbing member of the present invention in which the cells are aligned such that the major axis is generally parallel to the direction of impact.

FIGS. 7 and 8 show force-deflection curves for samples of energy absorbing member 16, wherein member 16 is composed of 3/16"-22 gage flattened expanded metal, member 16 is arranged in a serpentine configuration, and cells 22 are diamond-shaped. In FIG. 7, energy absorbing member 16 was oriented such that minor axis 34 was generally parallel to the direction of impact. As shown, the force absorbed by energy absorbing member 16 per unit of displacement rises upon impact, then remains substantially constant over a displacement during compression of over 50% of the original height of the energy absorbing lattice. Thus, the force-deflection curves assume a near square wave characteristic, as indicated by their average shape factor of 0.8 or higher. It is desirable that the force-deflection curve have somewhat rounded corners, so that the object is not instantaneously accelerated or decelerated by the impacting force.

In FIG. 8, energy absorbing member 16 was oriented such that major axis 32 was generally parallel to the direction of impact. It can be seen these curves do not exhibit a near square wave characteristic, which is indicated by their average shape factor of 0.4 or lower. Furthermore, the force "spike" present in each curve can adversely decelerate the object, and increase the potential for damage or bodily injury. Therefore, the orientation of cells 22 wherein minor axis 34 is substantially parallel with the direction of impact constitutes the preferred embodiment of the present invention.

Force-displacement characteristics have been measured for a variety of lattice structures of energy absorbing member 16. It has been found that section length, bend angle, section height, strand width, strand thickness, and degree of flattening as well as a number of processing variables all impact the shape factor.

Another way of characterizing the performance of an energy absorbing member is to measure the acceleration vs. time curve for an object impacting the member. For many materials, including most metals, the dynamic acceleration vs. time curve for an object traveling at a speed of over ~2 mph is similar to the static force-deflection curve measured at slow rates of crushing, on the order of ~0.01 mph.

A plot of acceleration vs. time is typically used to measure the performance of a human headform impacting the interior of a motor vehicle. By convention, this measurement is defined as the "Head Injury Criterion" and denoted most recently by $HIC_d$. HICd is calculated according to Federal Motor Vehicle Safety Standard 201, which is incorporated herein by reference. The headform by convention is usually taken as 10 lbs. in weight and approximates the shape of the human head, and travels at a speed of 15 mph.

If the performance of a headform is measured upon impact with the unitized body or cage of a motor vehicle lacking any trim cover or energy absorbing members, $HIC_d$ is typically measured to be greater than 2000, and sometimes above 3000. $HIC_d$ can be lower if the cage is relatively flexible, the headform hits at a glancing angle, or an aesthetic trim cover is installed. Designers prefer $HIC_d$ to be less than 1000, and sometimes less than 800.

According to the above-described parameters for $HIC_d$ determination, a number of dynamic tests of the energy absorbing member of the present invention were conducted. Measurements of $HIC_d$ were collected using a drop tower test stand and a trim cover attached to a vehicle A pillar, which normally extends upwardly between the windshield and front door window from the lower body to the roof on both sides of a vehicle. In a first test, energy absorbing plastic vanes were molded into the trim cover, resulting in an $HIC_d$ of 1428. In a second test, the energy absorbing member in a serpentine embodiment of the present invention was attached to the trim cover. The energy absorbing member contained diamond-shaped cells and was arranged such that the minor axis of the cells was parallel to the direction of impact. For the four samples tested, the $HIC_d$ averaged a greatly reduced value of 723.

In the preferred embodiment, energy absorbing assembly 10 also includes means for attaching the incident member to a support surface, such as a pillar or headrail of a vehicle. Attachment means include glue, insert molding, press fits, snap fits, heat staking, fasteners, welding, brazing, or other metal joining methods.

FIGS. 9 and 10 show examples of energy absorbing member 16 attached to the attachment region 17 of a vehicle A pillar cover 44 and a vehicle B pillar cover 46, respectively. The vehicle B pillar extends upwardly to the roof at a location just behind the front door on both sides of a vehicle. While energy absorbing member 16 is shown placed in a generally vertical direction on A pillar cover 44 (FIG. 8) and B pillar cover 46 (FIG. 9), energy absorbing member 16 may be placed in other orientations.

FIG. 11 depicts energy absorbing members 16 disposed at least partially within a filler material 48, such as a polymeric material, a foam, a gas, or mixtures thereof. Such a configuration might be utilized to protect a vehicle headrail, which is attached to the tops of the vehicle A and B pillars to form the perimeter of the roof of the vehicle. Impregnation of such substances within energy absorbing assembly 10 may improve wall buckling resistance. Various materials may also be placed interstitially within energy absorbing assembly 10 to provide rebound, including metal springs and polymers exhibiting elasticity.

Other support surfaces associated with a vehicle include an instrument panel, a seat, a seat back, an integrated seat restraint mechanism, a door panel, door mounted hardware, a dome light, an overhead console, pillar-mounted safety restraint hardware, a headliner, a bumper, a knee bolster, a seat anti-submarine ramp, and a steering column. All are intended to lie within the scope of the term "support surface" as used herein.

It should be understood that the applications of energy absorbing assembly 10 are not limited to vehicles. In the aviation field, energy absorbing assembly 10 may be used for arresting gear and landing gear, plus interior energy absorbers to protect occupants. In the sports arena and other personal protection equipment markets, the disclosed assembly 10 may usefully be embodied in head gear (helmets for football, skiing, hockey, etc.), teeth guards, and knee, hip, elbow and shoulder pads. The disclosed invention also finds utility in shipping carton protectors which would replace or supplement existing foams. Further, energy absorbing assembly 10 could be used as a mounting for earthquake-resistant buildings and structures.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. An energy absorbing assembly for decelerating an object that impacts the assembly, the assembly comprising:
   an incident member having an incident surface that meets the impacting object; and
   at least one energy absorbing member attached to an attachment region of an opposing face of the incident member for accommodating deformation of the assembly,
   the at least one energy absorbing member comprising a lattice of interconnected strands, the strands intersecting to define a plurality of cells,
   wherein the energy absorbing member is oriented such that each cell is substantially perpendicular to the attachment region in order to maximize energy absorption over a given distance,
   the lattice collapsing and at least some of the cells becoming at least partially closed during energy absorption.

2. The energy absorbing assembly of claim 1, wherein substantially all of the energy absorbing member is utilized in energy absorption.

3. The energy absorbing assembly of claim 1, wherein the energy absorbing member comprises a plurality of interconnected sectors, each sector having a center point.

4. The energy absorbing assembly of claim 3, wherein any two consecutive sectors are coplanar.

5. The energy absorbing assembly of claim 3, wherein an imaginary line joining the center points of any three consecutive sectors is linear.

6. The energy absorbing assembly of claim 3, wherein an imaginary line joining the center points of any three consecutive sectors is curvilinear.

7. The energy absorbing assembly of claim 3, wherein each sector includes substantially planar segments joined by curvilinear segments.

8. The energy absorbing assembly of claim 7, wherein the planar segments and the curvilinear segments are arranged to form a serpentine configuration of the energy absorbing member.

9. The energy absorbing assembly of claim 3, wherein an imaginary line joining the center points of any two consecutive sectors lies in a plane substantially perpendicular to the incident surface.

10. The energy absorbing assembly of claim 3, wherein an imaginary line joining the center points of any two consecutive sectors lies in a plane substantially parallel to the incident surface.

11. The energy absorbing assembly of claim 1, further comprising a filler material disposed adjacent to the opposing face of the incident member, the filler material being selected from a group consisting of polymeric material, a foam, a gas, and mixtures thereof.

12. The energy absorbing assembly of claim 1, wherein the cells are diamond-shaped before impact of the object.

13. The energy absorbing assembly of claim 1, wherein the cells are generally pie-shaped before impact of the object.

14. The energy absorbing assembly of claim 1, wherein the cells are polygonal before impact of the object.

15. The energy absorbing assembly of claim 1, wherein the energy absorbing member is 1–5 cells in height.

16. The energy absorbing assembly of claim 1, wherein each cell is defined by a major axis and a minor axis, wherein the major axis is longer than the minor axis.

17. The energy absorbing assembly of claim 16, wherein each cell is oriented such that the minor axis is substantially parallel to the direction of impact, and the major axis is substantially perpendicular to the direction of impact in order to maximize energy absorption over a given distance.

18. The energy absorbing assembly of claim 1, wherein the energy absorbing member absorbs energy in a near square-wave manner.

19. The energy absorbing assembly of claim 1, further comprising means for attaching the incident member to a support surface.

20. The energy absorbing assembly of claim 19, wherein the support surface is selected from the group consisting of: an A pillar, a B pillar, a C pillar, a headrail, an instrument panel, a seat, a seat back, an integrated seat restraint mechanism, a door panel, door mounted hardware, a dome light, an overhead console, pillar-mounted safety restraint hardware, a headliner, a bumper, a knee bolster, a seat anti-submarine ramp, and a steering column, the group being associated with a vehicle.

21. The energy absorbing assembly of claim 1, wherein the lattice is made by perforating, expanding, burning, punching, laser cutting, or blanking a sheet.

22. The energy absorbing assembly of claim 1, wherein the lattice is made by molding, casting, or other solidification processes.

23. The energy absorbing assembly of claim 1, wherein the lattice is made by welding, brazing, or other joining processes.

24. The energy absorbing assembly of claim 1, wherein the lattice comprises expanded metal.

25. The energy absorbing assembly of claim 1, wherein the energy absorbing member is made by stamping, roll-forming, or other similar processes.

26. An energy absorbing assembly for decelerating an object that impacts the assembly, the assembly comprising:
at least one energy absorbing member for accommodating deformation of the assembly,
the at least one energy absorbing member comprising a lattice of interconnected strands, the strands intersecting to define a plurality of cells,
wherein the energy absorbing member is oriented such that the plane of each cell is substantially parallel to the direction of impact, such that substantially all of the energy absorbing member is utilized in energy absorption, thereby maximizing energy absorption over a given distance,
the lattice collapsing and at least some of the cells becoming at least partially closed during energy absorption; and
a filler material disposed at least partially within the at least one energy absorbing member.

27. An energy absorbing member for decelerating, in combination with an incident member, a filler material, or both, an object that impacts the energy absorbing member, the energy absorbing member comprising:
a lattice of interconnected, intersecting strands; and
a plurality of cells defined by the intersecting strands,
wherein each cell is defined by a minor axis and a relatively longer major axis,
wherein each cell is oriented such that the minor axis is substantially parallel to a component of the impacting force that is resolved orthogonally to the incident surface, and the major axis is substantially perpendicular to the component of the impacting force that is resolved orthogonally to the incident surface in order to maximize energy absorption over a given distance.

28. The energy absorbing member of claim 27, wherein substantially all of the energy absorbing member is utilized in energy absorption.

\* \* \* \* \*